J. M. WRIGHT.
FLOAT MECHANISM.
APPLICATION FILED JUNE 25, 1917.
1,341,002.
Patented May 25, 1920.
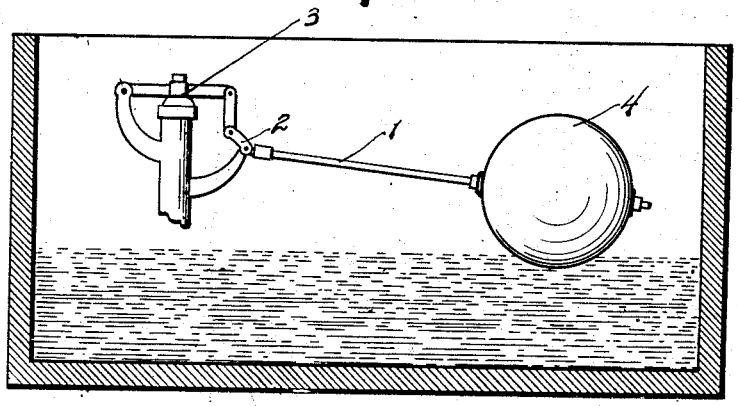
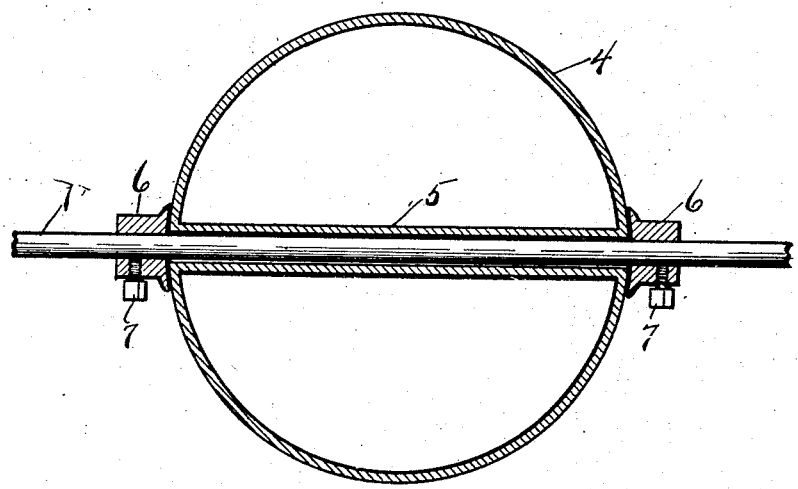
Witness
O. E. Arundel
Inventor
John M. Wright
By
Attorney

UNITED STATES PATENT OFFICE.

JOHN M. WRIGHT, OF BIRMINGHAM, ALABAMA.

FLOAT MECHANISM.

1,341,002.          Specification of Letters Patent.          Patented May 25, 1920.

Application filed June 25, 1917. Serial No. 176,690.

*To all whom it may concern:*

Be it known that I, JOHN M. WRIGHT, a citizen of the United States of America, residing at Birmingham, in the county of Jefferson and State of Alabama, have invented certain new and useful Improvements in Float Mechanism, of which the following is a specification.

This invention relates to a float mechanism especially designed for the flush tanks of closet bowls, but available in all cases where float controlled mechanism is employed.

The object of the invention is to improve the durability of floats and the reliability of their operation by forming the float with a tube extending diametrically therethrough through which the float rod passes loosely so that the float ball is free to turn thereon and I preferably form the float ball of glass or other rust-proof material, thus making it proof against deterioration. By leaving the float ball free to turn on the rod it will be at once apparent that if it strikes the sides of the tank or other object, instead of binding against the same it will have a rolling contact and will continue to function as contemplated.

A further advantage of my improved float is that it can be adjusted lengthwise of the float rod and set at the desired position thereon without requiring any work on the float rod. Where the float is screwed onto the rod, in order to obtain such adjustment it is necessary to cut and thread the rod which steps are avoided by my invention.

My invention further comprises the novel details of construction and arrangements of parts, which in their preferred embodiment only, are illustrated in the accompanying drawings, which form a part of this specification, and in which:—

Figure 1 is a side elevation of my improved float mechanism with the float tank shown in section.

Fig. 2 is a cross section taken through the float enlarged.

Similar reference numerals refer to similar parts throughout the drawings.

I have illustrated my improved type of float mounted on a suitable type of float rod 1, which at its inner end is suitably connected to a crank 2 for operating the float controlled valve mechanism 3. The outer end of the float rod is plain and unthreaded. The float 4 as shown, is in the shape of a globe though it may be of other commercial shapes and may be made of glass or any other material which is customarily employed in the manufacture of floats. Through the axis of rotation of the float passes a tubular partition 5, which at its ends is caused to make a leak tight joint with the float walls. The tube thus forms a passage-way extending diametrically or axially through the float and through which water or other fluid medium in which the float operates may pass freely without being able to gain access to the interior of the float. The float is mounted on the float rod by inserting the free end of the latter through this tube 5. A stop bearing 6 is slipped on the rod in advance of the float and when the latter has been adjusted to the desired position on the rod this bearing is fixed in that position by a set screw 7 or equivalent means. Preferably, the surface of the stop bearing 6 which engages the float is curved to conform to the adjacent float surface. A stop bearing member similar to 6 is made fast on the opposite side of the float by a set screw 7 or equivalent fastening means, and preferably these stop bearings 6 are so spaced as to leave the float free to turn loosely on the rod 1 as an axis. This feature is of special advantage in floats for closet tanks as it will prevent the tendency of the float, should it happen to touch the tank walls, to bind or hang thereon.

It will be noted that I do not thread the float rod 1 for the attachment of the float thereto and this is another feature of special advantage in that it enables me to use a small rod unweakened by the threading and the workman can readily adjust the float to the desired point on the rod by loosening the set screws 7 for the bearings 6, after which the exposed end of the float rod is sawed or filed off. In the present practice, various lengths of float rods having screw threaded ends must be carried in stock because the workman is not equipped to thread the rods to get an adjustment beyond that provided in manufacture and if it were attempted to increase the threaded zone on the rod to provide for the maximum adjustments of the float the rod would be materially weakened thereby.

The ease of adjustment and the rolling contact permitted the float should it engage the tank walls or other fixed parts are the most distinctive features of my invention, while the increased cost of its manufacture is negligible over the present type of floats.

Having thus described my invention, what I claim as new and desire to secure by Letters Patent, is:—

1. The combination with a pivoted float rod of a float pierced by a diametrically disposed tube slidable lengthwise on said rod and freely rotatable thereon, end bearings for holding the float free for rotation in the desired position on said rod, and set screws for the attachment of said bearings to the float rod, substantially as described.

2. In combination, a pivoted float rod having its free end unthreaded, a float having a diametrically disposed tube piercing it and adapted to slidably and rotatably move on the float rod, and adjustable end bearings mounted on the rod by set screws and adapted to hold the float rotatably mounted in the desired position on the float rod, substantially as described.

In testimony whereof I affix my signature.

JOHN M. WRIGHT.

Witness:
NOMIE WELSH.